No. 653,465. Patented July 10, 1900.
D. BEST.
TRAVELING HARVESTER.
(Application filed Oct. 17, 1899.)

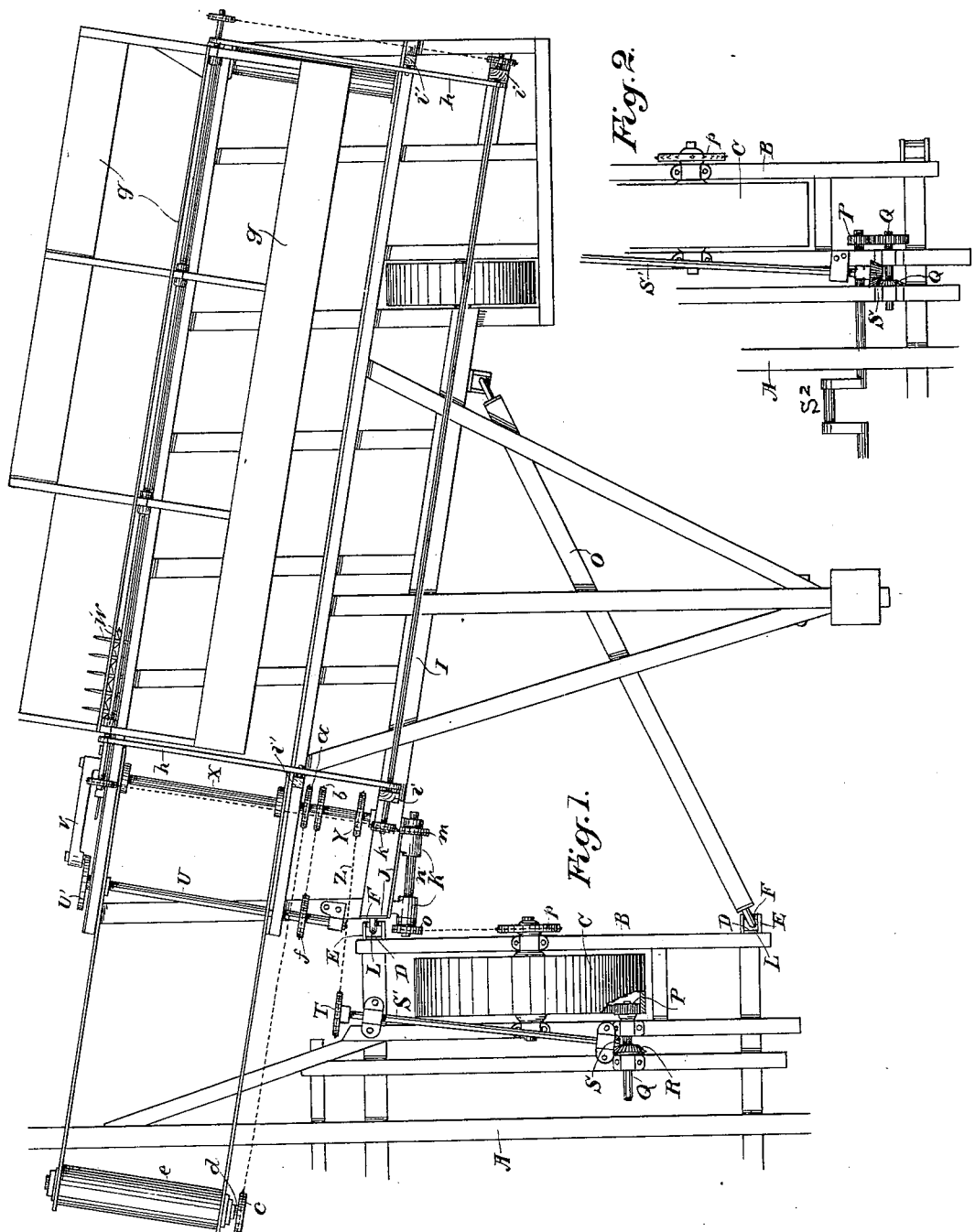

(No Model.) 2 Sheets—Sheet 2.

Witnesses,

Inventor,
Daniel Best
By Dewey Strong & Co
Att'y

United States Patent Office.

DANIEL BEST, OF SAN LEANDRO, CALIFORNIA.

TRAVELING HARVESTER.

SPECIFICATION forming part of Letters Patent No. 653,465, dated July 10, 1900.

Application filed October 17, 1899. Serial No. 733,916. (No model.)

*To all whom it may concern:*

Be it known that I, DANIEL BEST, a citizen of the United States, residing at San Leandro, county of Alameda, State of California, have invented an Improvement in Traveling Harvesters; and I hereby declare the following to be a full, clear, and exact description of the same.

My invention relates to that class of machines known as "traveling harvesters," in which the grain is cut, delivered to the threshing-cylinder, threshed, separated, and cleaned in continuous operations.

It consists in improved means for connecting the header portion with the threshing-machine frame and in means for transmitting power from the driving parts of the threshing-machine portion to drive the sickle-carrying belt or draper-reel and various parts of the header mechanism.

It also comprises details of construction, which will be more fully explained by reference to the accompanying drawings, in which—

Figure 3:
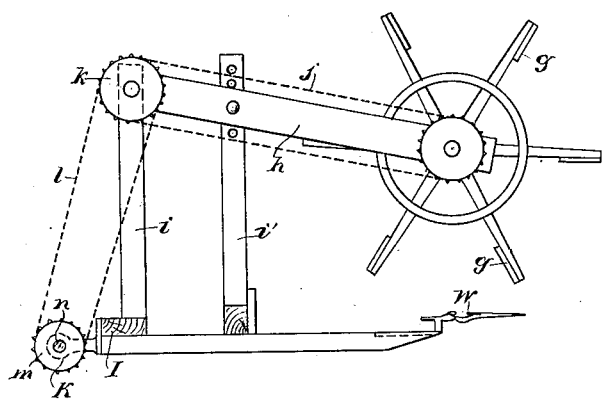
Figure 4:
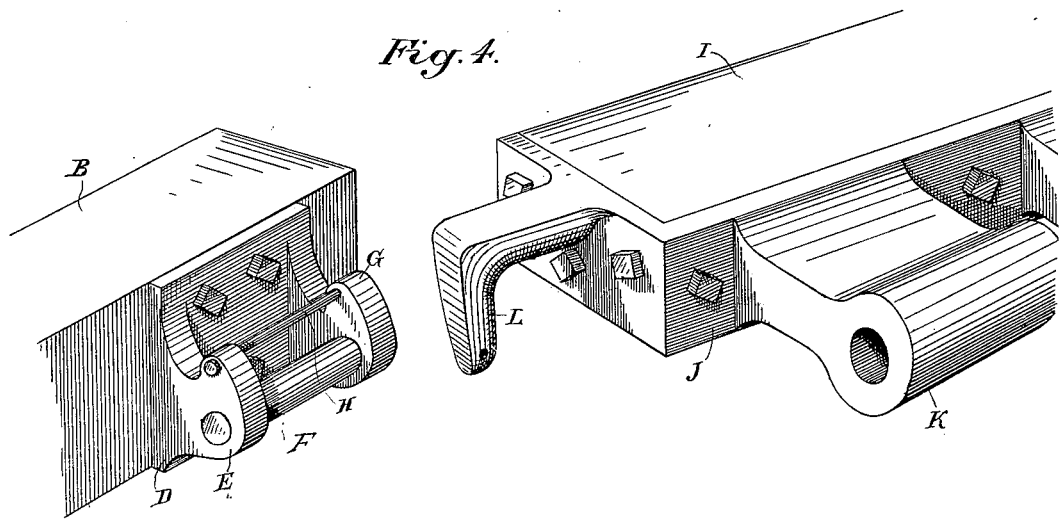

Figure 1 is a plan view of a portion of the harvester. Fig. 2 shows the arrangement when steam is used as the motive power. Fig. 3 is a side elevation of the reel and connections. Fig. 4 is a detail of the means to connect the header-frame with the separator.

In the connection of the header-frame with the frame of the threshing-machine it is usually hinged to the side of the threshing-machine and projects to a very considerable distance to the right side thereof, having a bearing-wheel at the outer end and a cutter-bar and sickle at the front, which may be made of any desired length, having a length of from sixteen to as much as forty feet in some cases. It has been found difficult to so connect the header with the threshing-machine that it can be allowed the various tilting movements which are necessary, first, to accommodate it to the varying conditions of the ground over which the outer bearing-wheel travels, and, secondly, to allow the frame to be tilted vertically, so as to properly cut high or low grain. It has also been found difficult to make a proper connection between the driving mechanism carried by the threshing-machine frame and that portion which is carried by the header and to accommodate it to the varying positions previously mentioned without interfering with its freedom of action. These connections have usually been made in the form of knuckle or universal joints in shafts which are journaled as nearly as possible in the line of the hinges which connect the header-frame with that of the threshing-machine.

The first portion of my invention as here described relates to the connection of the header-frame with the threshing-machine frame.

A is one of the main longitudinal timbers of the threshing-machine frame, and B is the outer timber of an extension at one side of the main frame, within which the bearing-wheel C is journaled and turnable and which I call the "wheel-frame." Upon the sides of this frame-timber B are fixed plates D, having outwardly-projecting lugs E, and between these lugs extends a pin F. Small lugs G project upwardly from the lugs E, or equivalent extensions are made therefrom adapted to receive the pin H, which serves to lock the engaging hook in place, as will be hereinafter described.

Upon the timber I, at the rear of the header-frame, is fixed a metal casting J, and this casting carries journal-boxes K, the use of which will be hereinafter described, and also a bent hook L, which extends from the inner end of the casting, bends downward, and is adapted to engage with the pin F, which is fixed to the front end of the frame-timber B. I have found that the weight of the front portion of the header-frame is usually sufficient to retain this hook in its engagement with the pin F without the use of the upper pin H; but the latter may be used if found desirable or necessary. By this engagement I form a universal swivel-joint, the hook engaging the pin F in such a manner as to be turnable to allow the outer end of the header-frame to rise or fall with relation to the threshing-machine frame, and it also allows the front of the header-frame to be raised and depressed for cutting different heights of grain.

In order to hold the outer end of the header-frame in proper relation with the threshing-machine frame and prevent its swinging backward when advancing, I use the brace-bar O, the inner end of which is connected with the rear portion of the wheel-frame timber B by a hook L, engaging with a pin F, similar to that connecting with the front end of this timber. The outer end of the brace-bar O is similarly connected with the outer end of the rear timber I, and by reason of the swivel-hooks it will be seen that the ends of the timber O will have a freedom of motion to allow it to adjust itself to the varying movements of the header-frame without in any way binding, while at the same time it serves its purpose as a brace and connection between the outer end of the header-frame and the side of the threshing-machine frame. Any tendency of these hooks to jump out of place during the operation of the machine is prevented by the use of the pins H, extending through the lugs G, as previously described, or an equivalent locking device. This arrangement enables the operator to quickly disengage the header from the threshing-machine frame when the two have to be separated for transportation to distant points when it is not convenient to transport the machine extended to its full width. The disengaging of the parts is quickly effected, they are easily and quickly put together again when necessary, and the freedom of movement of the joints adds greatly to the effectiveness of the machine.

The driving mechanism when operated from the wheel C consists of an internal gear formed with or fixed to the wheel rim or spokes interior to the tread of the wheel, and this engages a pinion P, mounted upon a wheel-shaft Q, which is journaled in boxes upon the threshing-machine frame interior to the wheel C. Upon the shaft Q is a beveled gear-wheel R, and this engages a pinion S, which is fixed upon a shaft S', extending in an inclined direction, as shown, toward the front of the wheel-frame, beyond which this shaft projects far enough to carry a sprocket-wheel T. Across the header-frame extends a shaft U, having the crank or crank-wheel U' fixed upon its outer end, and by means of a pitman V connection is made between this crank-wheel and the sickle W.

X is a counter-shaft journaled across the header-frame approximately parallel with the shaft U' and having fixed upon it a sprocket-wheel Y. A chain Z extends from the sprocket-wheel T to the sprocket-wheel Y, and power is thus transmitted from the shaft S' to drive the shaft X. Upon the shaft X are fixed two sprocket-wheels $a$ and $b$, from the first of which a chain extends to the sprocket-wheel $c$ upon the shaft $d$, which carries the drum or roller $e$, over which the carrying-belt or draper at the front of the header-frame travels and by which motion is transmitted to move it so as to carry the cut grain which falls upon this belt and deliver it into the feeder-house of the threshing-machine in the usual manner. From the sprocket-wheel $b$ a chain passes to the sprocket-wheel $f$, which is fixed upon the sickle-driving crank-shaft U, and power is thus transmitted from the counter-shaft X to drive the sickle. By this transmission of power from the sprocket-wheel T to the sprocket-wheel Y by means of the chain Z I take advantage of the adjustability of the chain and sprocket-wheels to the varying positions of the threshing-machine frame and the header-frame without interfering with the transmission of power from one sprocket to the other.

It will be seen that the sprockets T and Y run in different planes owing to the position of the header-frame, the outer end of which is thrown back so that the header-frame is not at right angles with the threshing-machine frame; but I have found that by making the distance between the sprockets T and Y sufficiently long and providing the sprockets with outwardly-projecting arms, if necessary, that the chain will run fairly upon the sprockets even although they are out of line, and will transmit the power needed in a satisfactory manner. I am thus enabled to avoid the use of the shafts essentially in the line of the hinge-joint between the header and threshing-machine frames and to provide for a very considerable up-and-down movement of the header-frame without interfering with the transmission of power here described.

The reel $g$, by which the grain is swept backwardly upon the carrying-belt or draper, is mounted in arms $h$, which are supported from vertical standards $i$ $i'$, fixed upon the header-frame, and the reel may be raised or lowered in the usual manner by means of pins passing through holes in the standard $i'$. Motion is communicated to the reel by means of a belt $j$, passing around the pulleys upon the reel-shaft, and a pulley $k$ upon a shaft journaled in the upper end of the post $i$. Another belt or chain $l$ extends from the pulley $m$ to the pulley upon the shaft which carries the pulley $k$, and this allows for the raising and lowering of the reel. The pulley or sprocket $m$ is fixed upon a shaft $n$, which is journaled in the boxes K, formed or fixed upon the side of the metal plate or socket J, previously described. Power is transmitted to the shaft $n$ by means of a chain passing around a sprocket $o$ on the shaft $n$ and a sprocket $p$, carried upon the outer end of the shaft of the main bearing-wheel C of the threshing-machine frame, this connection also allowing for the slight change in the plane of the two sprockets P and O and the various movements of the header-frame without interfering with the upper driving of the parts.

When a supplemental engine is mounted upon the separator-frame to furnish power to drive the various parts, as shown in my Patent No. 410,307, dated September 3, 1889, it will be manifest that connection can be made between the engine and the shaft $S^2$, as shown in Fig. 2, the remainder of the mechanism remaining essentially the same. It will also be understood that the arrangement of the various parts and connections may be changed to suit different forms of machines; but the essential feature of the driving is in the flexible chain or belt transmission from the separator to the header.

Having thus described my invention, what I claim as new, and desire to secure by Letters Patent, is—

1. In a traveling harvester and in combination with the threshing-machine and header frames thereof, means connecting the rear inner corner of the header-frame with the other frame and including a normally-open socket on one frame and a hook on the other frame forming with said socket a substantially-universal joint whereby the outer end of the header-frame is permitted to rise and fall and the front of the header-frame is permitted to be raised and depressed for cutting different heights of grain.

2. In a traveling harvester, the combination with the threshing-machine and header frames, of a substantially-universal coupling-joint between the two and composed of members separable from each other by a single movement, and adapted to provide for a rise and fall of the front of the header-frame and to transmit the forward movement of one frame to the other.

3. In a traveling harvester and in combination with the threshing-machine and header frames thereof, a plate fixed to the threshing-machine frame and having outwardly-projecting lugs and a transverse pin, another plate fixed to the rear inner corner of the header-frame and having a downturned hook adapted to engage the pin of the first-named plate with a substantially-universal movement whereby the outer end of the header-frame may rise and fall and the front of said header-frame may be elevated and depressed to cut different heights of grain, and a brace-timber connected at its opposite ends to said frames by substantially-universal joints.

4. In a traveling harvester, and in combination with the threshing-machine and header frames thereof, and a brace-timber therebetween and detachably connected thereto, of an open-top socket device on the thresher-frame and a projecting hook at substantially the rear inner corner of the header-frame and forming with the socket device a substantially-universal coupling-joint composed of members separable from each other by a single movement whereby the header-frame is readily detachable for transportation purposes.

5. In a traveling harvester and in combination with the threshing-machine and header frames, and a brace-timber therebetween and connection therewith, of an open socket device on the threshing-machine frame and a downturned hook on substantially the rear inner corner of the header-frame, adapted to engage said socket device and form therewith a substantially universal-joint coupling whereby the front of the header-frame may be raised and depressed to cut grain of different heights.

6. In a traveling harvester and in combination with the threshing-machine and header frames thereof, and a brace-timber therebetween and connected therewith at both ends by a substantially universal-joint coupling, of a plate fixed to the threshing-machine frame and having outwardly-projecting lugs and a connecting transverse pin, a plate fixed to substantially the rear inner corner of the header-frame and having a downwardly-bent hook adapted to detachably engage the pin of the other frame and to provide a substantially universal-joint coupling to permit the front of the header-frame to be adjusted vertically to cut grain of different heights, and a locking-pin adapted to extend above the hook to prevent its disengagement.

7. In a traveling harvester the combination with the frame which supports the threshing-machine, and the frame which supports the heading mechanism, of a universal coupling-joint between said frames at substantially the rear inner corner of the header-frame said joint composed of members separable from each other by a single movement whereby the header-frame is readily detachable for transportation purposes.

8. In a traveling harvester and in combination with the threshing-machine and header frames thereof, and a hook-and-socket universal-joint connection between said frames at the rear inner corner of the header-frame, means for transmitting power from the main bearing-wheel of the threshing-machine to the mechanism of the header consisting of a shaft journaled approximately lengthwise of the threshing-machine frame next to the stubble side of the bearing-wheel, gearing by which power is transmitted from the bearing-wheel to said shaft, a shaft journaled upon the header-frame, sprocket-wheels upon both of said shafts, and a chain whereby power is transmitted from one to the other and independent movement of the header-frame with relation to the threshing-machine frame permitted.

9. In a traveling harvester and in combination with the header and thresher thereof, a substantially-universal coupling-joint between the header and thresher and formed of members separable from each other by a single movement, a power-shaft journaled upon the threshing-machine frame next to the stubble side of the bearing-wheel, gearing by which motion is transmitted thereto from the bearing-wheel, sickle and belt-driving shafts, and a counter-shaft journaled upon the threshing-machine frame, sprocket-wheels fixed upon the sickle, belt-driving, and counter shafts respectively, and chains by which motion is transmitted from the counter-shaft to the other shafts, a receiving sprocket-wheel fixed upon the counter-shaft and a sprocket-wheel upon the power-shaft on the threshing-machine frame and a chain extending between the two, whereby power is transmitted to drive the header mechanism.

10. In a traveling harvester, the combination of the header and threshing-machine frames and a brace-timber therebetween, substantially-universal coupling-joints between said frames and between the threshing-machine frame and brace-timber said joints composed of members separable from each other by a single movement, a shaft journaled in boxes on the rear inner portion of the header-frame, and having a sprocket-wheel, a sprocket-wheel on the grainward end of the bearing-wheel shaft, a chain connection between said sprocket-wheels, a reel and reel-frame carried upon the header-frame, and sprocket-wheels and chain connections whereby power is transmitted to the reel.

11. In a combined header and separator, a means forming a substantially-universal coupling-joint between the two at the rear inner corner of the header and including members separable from each other by a single movement, means for transmitting power between the driving devices of the separator and the header mechanism consisting of flexible chains extending between said mechanism and the driving devices of the separator, and sprocket-wheels over which said chains pass.

In witness whereof I have hereunto set my hand.

DANIEL BEST.

Witnesses:
S. H. NOURSE,
JESSIE C. BRODIE.